United States Patent
Gardner et al.

(10) Patent No.: US 11,714,658 B2
(45) Date of Patent: Aug. 1, 2023

(54) AUTOMATED IDLE ENVIRONMENT SHUTDOWN

(71) Applicant: MicroStrategy Incorporated, Vienna, VA (US)

(72) Inventors: Richard Gardner, Leesburg, VA (US); Clayton Myers, Oak Hill, VA (US); Andrew Smith, Oakton, VA (US); Timothy Lang, McLean, VA (US); Hao Shen, Fairfax, VA (US)

(73) Assignee: MicroStrategy Incorporated, Vienna, VA (US)

( * ) Notice: Subject to any disclaimer, the term of this patent is extended or adjusted under 35 U.S.C. 154(b) by 679 days.

(21) Appl. No.: 16/556,596

(22) Filed: Aug. 30, 2019

(65) Prior Publication Data

US 2021/0064388 A1 Mar. 4, 2021

(51) Int. Cl.
| | |
|---|---|
| G06F 9/4401 | (2018.01) |
| G06F 11/34 | (2006.01) |
| G06N 20/00 | (2019.01) |
| G06F 11/30 | (2006.01) |
| G06N 3/08 | (2023.01) |

(52) U.S. Cl.
CPC ........ *G06F 9/4416* (2013.01); *G06F 11/3438* (2013.01); *G06N 20/00* (2019.01)

(58) Field of Classification Search
CPC .... G06F 9/4416; G06F 11/3438; G06N 20/00
See application file for complete search history.

(56) References Cited

U.S. PATENT DOCUMENTS

| | | |
|---|---|---|
| 5,630,142 A | 5/1997 | Crump et al. |
| 7,489,923 B2 | 2/2009 | Varanda |
| 7,870,550 B1 | 1/2011 | Qureshi et al. |
| 7,935,613 B2 | 5/2011 | Gulari |
| 8,065,676 B1 | 11/2011 | Sahai et al. |
| 8,141,090 B1 | 3/2012 | Graupner et al. |
| 8,230,070 B2 | 7/2012 | Buyya et al. |
| 8,347,263 B1 | 1/2013 | Offer |

(Continued)

FOREIGN PATENT DOCUMENTS

| | | |
|---|---|---|
| CN | 102096461 | 6/2013 |

OTHER PUBLICATIONS

Airwatch: "AirWatch Enterprise Mobility Management Demo," YouTube, Jul. 22, 2014, retrieved from the Internet <https://www.youtube.com/watch?v=ucV1n4-tgk>, retrieved on May 3, 2017, 1 page.

(Continued)

*Primary Examiner* — Jaweed A Abbaszadeh
*Assistant Examiner* — Gayathri Sampath
(74) *Attorney, Agent, or Firm* — Fish & Richardson P.C.

(57) ABSTRACT

Methods, systems, and apparatus, including computer-readable media, for automated idle environment shutdown. In some implementations, activity of a server environment is monitored over a period of time. A measure of user-initiated activity of the server environment is determined based on the monitored activity of the server environment over the period of time. The level of user-initiated activity over the period of time is determined to be less than a threshold level. In response to determining that the level of user-initiated activity over the period of time is less than the threshold level, shut down of the server environment is initiated.

20 Claims, 6 Drawing Sheets

(56) References Cited

U.S. PATENT DOCUMENTS

| | | | |
|---|---|---|---|
| 8,392,364 | B2 | 3/2013 | Horn et al. |
| 8,527,793 | B2 | 9/2013 | Chan et al. |
| 8,589,955 | B2 | 11/2013 | Roundtree et al. |
| 8,645,745 | B2 | 2/2014 | Barsness et al. |
| 8,799,115 | B2 | 8/2014 | Schmitt |
| 8,839,238 | B2 | 9/2014 | Huang et al. |
| 8,997,038 | B2 | 3/2015 | Bozek et al. |
| 9,043,458 | B2 | 5/2015 | Balaji et al. |
| 9,124,579 | B2 | 9/2015 | Lee |
| 9,134,964 | B2 | 9/2015 | Hirsch |
| 9,170,800 | B2 | 10/2015 | Lang |
| 9,361,011 | B1 | 6/2016 | Burns |
| 9,426,433 | B1 | 8/2016 | Mazzarella |
| 9,461,972 | B1 | 10/2016 | Mehta |
| 9,495,214 | B2 | 11/2016 | Tatsubori et al. |
| 9,715,370 | B2 | 7/2017 | Friedman |
| 9,733,985 | B2 | 8/2017 | Lyoob et al. |
| 9,753,618 | B1 | 9/2017 | Jain |
| 9,858,063 | B2 | 1/2018 | Jain et al. |
| 9,886,267 | B2 | 2/2018 | Maheshwari et al. |
| 10,210,567 | B2 | 2/2019 | Mick et al. |
| 10,411,975 | B2 | 9/2019 | Martinez et al. |
| 10,938,674 | B1 | 3/2021 | Natanzon et al. |
| 2002/0022973 | A1 | 2/2002 | Sun |
| 2003/0236745 | A1 | 12/2003 | Hartsell et al. |
| 2005/0086587 | A1 | 4/2005 | Balz |
| 2006/0282516 | A1 | 12/2006 | Taylor |
| 2007/0130097 | A1* | 6/2007 | Andreev .............. G06F 11/3447 706/46 |
| 2008/0052343 | A1 | 2/2008 | Wood |
| 2008/0126110 | A1 | 5/2008 | Haeberle et al. |
| 2008/0127040 | A1 | 5/2008 | Barcellona |
| 2009/0043689 | A1 | 2/2009 | Yang |
| 2009/0106571 | A1* | 4/2009 | Low ....................... G06F 9/5094 709/224 |
| 2009/0119678 | A1 | 5/2009 | Shih |
| 2009/0156190 | A1 | 6/2009 | Fisher |
| 2010/0211941 | A1 | 8/2010 | Roseborough |
| 2010/0229014 | A1* | 9/2010 | Blackburn .......... G06F 11/3442 709/224 |
| 2011/0200979 | A1 | 8/2011 | Benson et al. |
| 2012/0131594 | A1 | 5/2012 | Morgan |
| 2012/0185913 | A1 | 7/2012 | Martinez et al. |
| 2012/0239739 | A1 | 9/2012 | Manglik et al. |
| 2012/0311154 | A1 | 12/2012 | Morgan |
| 2013/0110565 | A1 | 5/2013 | Means |
| 2013/0283188 | A1 | 10/2013 | Sanghvi |
| 2014/0026113 | A1 | 1/2014 | Farooqi |
| 2014/0033171 | A1 | 1/2014 | Lorenz |
| 2014/0088995 | A1 | 3/2014 | Damani |
| 2014/0100883 | A1 | 4/2014 | Hamilton |
| 2014/0101628 | A1 | 4/2014 | Almog |
| 2014/0109072 | A1 | 4/2014 | Zhongmin et al. |
| 2014/0109115 | A1 | 4/2014 | Low |
| 2014/0109177 | A1 | 4/2014 | Baron et al. |
| 2014/0137112 | A1* | 5/2014 | Rigolet ............... G06F 9/45558 718/1 |
| 2014/0156823 | A1 | 6/2014 | Liu |
| 2014/0240122 | A1 | 8/2014 | Roberts |
| 2014/0258446 | A1 | 9/2014 | Bursell |
| 2014/0273913 | A1 | 9/2014 | Michel |
| 2014/0278536 | A1 | 9/2014 | Zhang |
| 2014/0324647 | A1 | 10/2014 | Iyoob et al. |
| 2015/0074635 | A1 | 3/2015 | Margiotta |
| 2015/0089224 | A1 | 3/2015 | Beckman |
| 2015/0135160 | A1 | 5/2015 | Gauvin |
| 2015/0163121 | A1 | 6/2015 | Mahaffey et al. |
| 2015/0294090 | A1 | 10/2015 | Kodiyan |
| 2016/0058287 | A1 | 3/2016 | Dyell |
| 2016/0092339 | A1 | 3/2016 | Straub |
| 2016/0094622 | A1 | 3/2016 | Bartholomew et al. |
| 2017/0048215 | A1 | 2/2017 | Straub |
| 2017/0085447 | A1 | 3/2017 | Chen et al. |
| 2017/0199770 | A1 | 7/2017 | Peteva et al. |
| 2017/0224275 | A1* | 8/2017 | Zhang ...................... A61B 5/11 |
| 2018/0018154 | A1 | 1/2018 | Burns et al. |
| 2018/0046453 | A1 | 2/2018 | Nair et al. |
| 2018/0048532 | A1 | 2/2018 | Poort et al. |
| 2018/0121187 | A1 | 5/2018 | Jain et al. |
| 2018/0288143 | A1* | 10/2018 | Hwang ............... H04L 67/1031 |
| 2020/0026580 | A1 | 1/2020 | Baliramshahry et al. |
| 2020/0285503 | A1* | 9/2020 | Dou ..................... G06F 9/45558 |
| 2020/0311573 | A1* | 10/2020 | Desai ..................... H04L 41/16 |
| 2021/0064388 | A1 | 3/2021 | Gardner et al. |

OTHER PUBLICATIONS

Airwatch: "Airwatch laptop management demo," YouTube, Oct. 3, 2014, retrieved from the Internet <https://www.youtube.com/watch?v=3gHfmdVZECM>, retrieved on May 3, 2017, 1 page.

Henze et al., Push the study to the App store: evaluating off-screen visualizations for maps in the android market, Sep. 2010, 2 pages.

Taivan et al., Application Diversity in Open Display Networks, Jun. 2014, 6 pages.

Zhang et al., "Workload Patterns for Quality-Driven Dynamic Cloud Service Configuration and Auto-Scaling," 2014 IEEE/ACM 7th International Conference on Utility and Cloud Computing, 2014, 156-65.

Office Action in U.S. Appl. No. 16/915,400, dated Mar. 28, 2022, 26 pages.

\* cited by examiner

AUTOMATED IDLE ENVIRONMENT SHUTDOWN

BACKGROUND

This specification relates generally to computer systems that can automatically shut down a computer environment, for example, based on usage information.

Some computing systems, such as servers, provide computing environments that are accessed by other devices. To ensure availability, many server-provided environments operate continuously. However, the actual need for an environment may vary and significant periods of time can pass when there is low usage or even no usage the environment. Continuing to operate environments that are idle can be a very inefficient use of computing resources and power that could better used for other purposes. On the other hand, aggressively shutting down environments may make environments unavailable to process client requests and result in outages and poor service.

SUMMARY

In some implementations, a computer system can use machine learning to monitor characteristics of server environments and produce instructions to shut down or power up on the server environments. The computer system can monitor aspects of a particular server environment over a period of time to determine usage patterns for that particular server environment. The usage patterns can be determined from an assessment of, for example, currently active user sessions in the computer environment, a number of users logged in to the computer environment, a number of active users logged in, scheduled application activity, user-initiated application activity, historical user activity on the computer environment, and a priority ranking of active CPU tasks. The computer system can additionally monitor reports or logs generated by the server environment that indicate activities performed using the server environment. These reports can be used to determine whether one or more users are currently logged in or are currently active, and to determine whether tasks being performed were scheduled tasks or were initiated based on a user action, such as by a user clicking on an icon of the application or a client device sending a request to the server environment. User activity for individual server environments can be monitored over a predetermined period of time, such as an hour, a day, a week, or longer, in order to determine the manner and extent that users make use of each individual environment. Data indicative of current and/or prior usage of a computing environment can be input to a trained machine learning model, which can produce output that indicates a prediction of how likely the environment is to have at least a threshold level of demand or utilization in a future time period. If the trained machine learning model predicts low usage of environment, the computer system can send instructions causing the environment to be automatically shut down, which can help to conserve or reallocate computing resources and increase power efficiency.

The computing system can also use machine learning techniques to determine when to power on computing environments. As noted above, the decision when to shut down an environment can be environment-specific, e.g., based at least in part on usage patterns observed for the environment. In a similar manner, environment-specific information, such as usage patterns, can be used to determine when to automatically start or power on an environment. Thus, the system can predictively shut down an environment when a machine learning model indicates that prospective usage is likely to be low, as well as predictively cause the environment to be powered up and made available again when a machine learning model indicates that demand is likely to meet or exceed a minimum level.

In some implementations, the computer system can provide notifications regarding its decisions to shutdown or restart environments, and the system can receive feedback indicating whether its decision were appropriate. For example, notifications can indicate, for example, that the system determined to shut down an environment. The notification may indicate information indicting factors used in making the decision, such as that only five users were logged in and that the users were not active. An administrator may approve or reject this decision before the environment is shut down, or after the shutdown occurs an administrator may indicate whether the action taken was appropriate or not. These instances of feedback, together with the monitored usage data indicating the situations and context for each decision the feedback addresses, can be used to update and refine the machine learning models to give more accurate performance in the future.

In some implementations, usage and feedback information can be provided for individual environments, allowing the system can better learn the needs for each environment individually. For example, it may be acceptable to shut down an environment providing a first application when fewer than ten users are active, while it may be important to not shut down an application providing a second application while any users are active. In general, a machine learning model may be trained based on aggregated data representing examples of usage scenarios of many different computing environments. In this manner, the model is more robust and can give accurate predictions across a wider variety of scenarios. Nevertheless, each individual environment may have certain rules or parameters customized, such as to apply different thresholds to outputs of the machine learning model. Thus, although a single machine learning model may be used to manage multiple environments, the management of each environment may be individually tuned. In addition, the machine learning model may be structured to receive input feature data, during training and when making predictions, that reflects characteristics of an environment. For example, the input may indicate a priority or importance score for the environment (e.g., indicating on a scale how important it is that availability be maintained), and a type of environment, such as whether an environment provides a file server, a database server, an application server, etc. With this input data, the machine learning model may learn to tune its predictions for different environments with particular types or characteristics.

The computer system can receive responses from users that indicate whether the machine learning model's predictions are correct or incorrect. For example, if the computer system shuts down a server environment because no logged in users have been active for two days, a user may provide a response indicating that a user has in fact been active and the environment should not have been shut down. Using a response such as this, the computer system can further train the machine learning model, e.g., using the prediction of an idle state as an example of an incorrect prediction given the environment's characteristics, and using a different prediction, such as a prediction of an active or in-use condition, to be an example of a correct prediction given the context of the environment's characteristics. Through this additional training, the machine learning model can be updated to provide a better prediction when similar activity and historical activity data are subsequently provided to the machine learning model.

In some implementations, the computer system can compare the output of its machine learning model to predetermined thresholds, e.g., usage likelihood threshold, to improve the accuracy of the machine learning model. A user can set the predetermined thresholds or the computer system can generate the predetermined thresholds.

In some implementations, the computer system can use multiple thresholds to determine whether to take different management actions with respect to a server environment. The computer system can consider predictions of a machine learning model as well as assessments of other conditions so that management actions are the result of a multi-factor decision. In other words, the computer system may consider additional factors beyond the output of the machine learning model in selecting management actions. As one example, the decision to shut down an environment may require multiple conditions to be satisfied, where some conditions are based on the output of a machine learning model and other conditions are not. For example, the computer system may (i) compare the output of the machine learning model to a predetermined threshold, as well as (ii) compare usage measures (which may or may not have been indicated to the machine learning model) to one or more predetermined thresholds. For example, the computer system may condition automatic shut down of an environment based on the level of user-initiated activity (such as a percentage usage or a number of initiated actions over a period of time). Even if the machine learning model predicts usage to be low over the next period of time (e.g., the next hour or the next day), the computer system may determine to maintain the environment in an active state if the current level of user-initiated activity is above a minimum threshold.

The techniques in this specification may be used to achieve one or more of the advantages discussed below. For example, significant power savings can be achieved by using predictions of a machine learning model to determine when to power down or power up a server environment. Additionally, the server environment's resources can be reallocated elsewhere if the server environment or one or more computers providing the server environment are instructed to shut down. For example, if the computer system instructs the server environment to shut down a server environment being hosted by a first computer, the resources of the first computer (e.g., power, CPU, memory, network bandwidth, etc.) can be reallocated to a second server environment that is expected to receive user activity. Thus, resources can be managed effectively across multiple server environments based on output of the machine learning model. Additionally, the computer system can reduce the amount of time environments remain operating in an idle state when no user is actively using the environment. By managing when to power on or shut down a server environment, the computing system reduces the overall wear and deterioration on components of the server environment. The computer system can effectively manage the server environment based on user and system activity by generating a high-confidence prediction with the machine learning model that can be used to determine whether to shut down or power on the server environment.

One of the advantages of the system is the ability to distinguish between meaningful activity (e.g., tasks initiated by users or client devices) and less urgent system actions (e.g., routine monitoring, logging, maintenance, etc.). In prior systems, monitoring CPU usage and memory usage kept systems from shutting down, even though the activity was due to tasks that were not time-critical or user facing (e.g., checking for updates, indexing data, performing backups, security monitoring, etc.). The present system can take into account the user activity levels (e.g., number of connected users or client devices, volume or load of user-initiated tasks, etc.), not merely the environment resource utilization overall. As a result, the present system can detect when activity is not based on user requests and achieve automatic shutdown in situations where prior systems would have remained active, even if only performing unimportant system tasks. Similarly, this approach can recognize user activity as important and maintain an environment in operation even though the amount or quantity of activity may be low. Thus, the type of activity, not only the volume, can be considered when determining whether to start, stop, or maintain a server environment.

The improvements in resource allocation and efficiency are achieved while minimizing the inconvenience to users. The machine learning model can learn and adapt as additional examples are received. The system can minimize the impact of automatic shutdown actions on users, by taking into account fine-grained information about actual usage before shutting down. The machine learning processing can be individualized for a particular organization and for a particular server environment. Similarly, the machine learning technique can be adaptive to adjust to changes in usage trends and requirements.

In a general aspect, a method includes: monitoring, by the one or more computers, activity of a server environment over a period of time; determining, by the one or more computers and based on the monitored activity of the server environment, a measure of user-initiated activity of the server environment over the period of time; determining, by the one or more computers, that the level of user-initiated activity over the period of time is less than a threshold level; and in response to determining that the level of user-initiated activity over the period of time is less than the threshold level, initiating, by the one or more computers, shut down of the server environment.

Implementations may include one or more of the following features. For example, in some implementations, the method includes after shutting down the server environment, determining, based at least in part on prior usage of the server environment, that user-initiated activity is likely to occur; and powering on the server environment in response to determining that user-initiated activity is likely to occur.

In some implementations, the method includes storing state information of the server environment, including data for one or more tasks running in the server environment, in non-volatile storage before shutting down the server environment; and wherein re-starting the server environment comprises loading the state information and resuming the one or more tasks that were running in the server environment before shutting down the server environment.

In some implementations, the method includes providing information indicating activity of the server environment to a machine learning model trained to provide output indicating a prediction of future use of the server environment; and wherein initiating shut down of the server environment is further based on the output of the machine learning model.

In some implementations, the method includes initiating shut down of the server environment is based on determining that the output of the machine learning model indicates that use of the server environment is likely to be less than a minimum level for at least a period of time in the future; wherein the output of the machine learning model indicates:

a prediction indicating an amount of use predicted over the period of time in the future; a likelihood that future use of at least a minimum level will occur over a particular period of time in the future; or a predicted time when use is predicted to reach a particular level.

In some implementations, the server environment is a virtual server environment, and shutting down the server environment comprises stopping the virtual server environment.

In some implementations, the server environment includes one or more server computers, and shutting down the server environment comprises powering down the one or more server computers.

In some implementations, monitoring activity of the server environment includes monitoring at least one of: central processing unit utilization, memory usage, an amount of network bandwidth utilized, an amount of input or output operations, a number of tasks running, types of tasks running, priority levels of tasks running, a number of users logged in to the server environment, a number of users actively using the server environment, or a level of interactivity of running tasks.

In some implementations, the method includes monitoring activity of the server environment includes measuring utilization of the server environment over the period of time; and wherein determining the measure of user-initiated activity of the server environment comprises determining a portion of the measured utilization that supports active user sessions that receive user input at a rate that satisfies a predetermined threshold.

Other embodiments of these aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
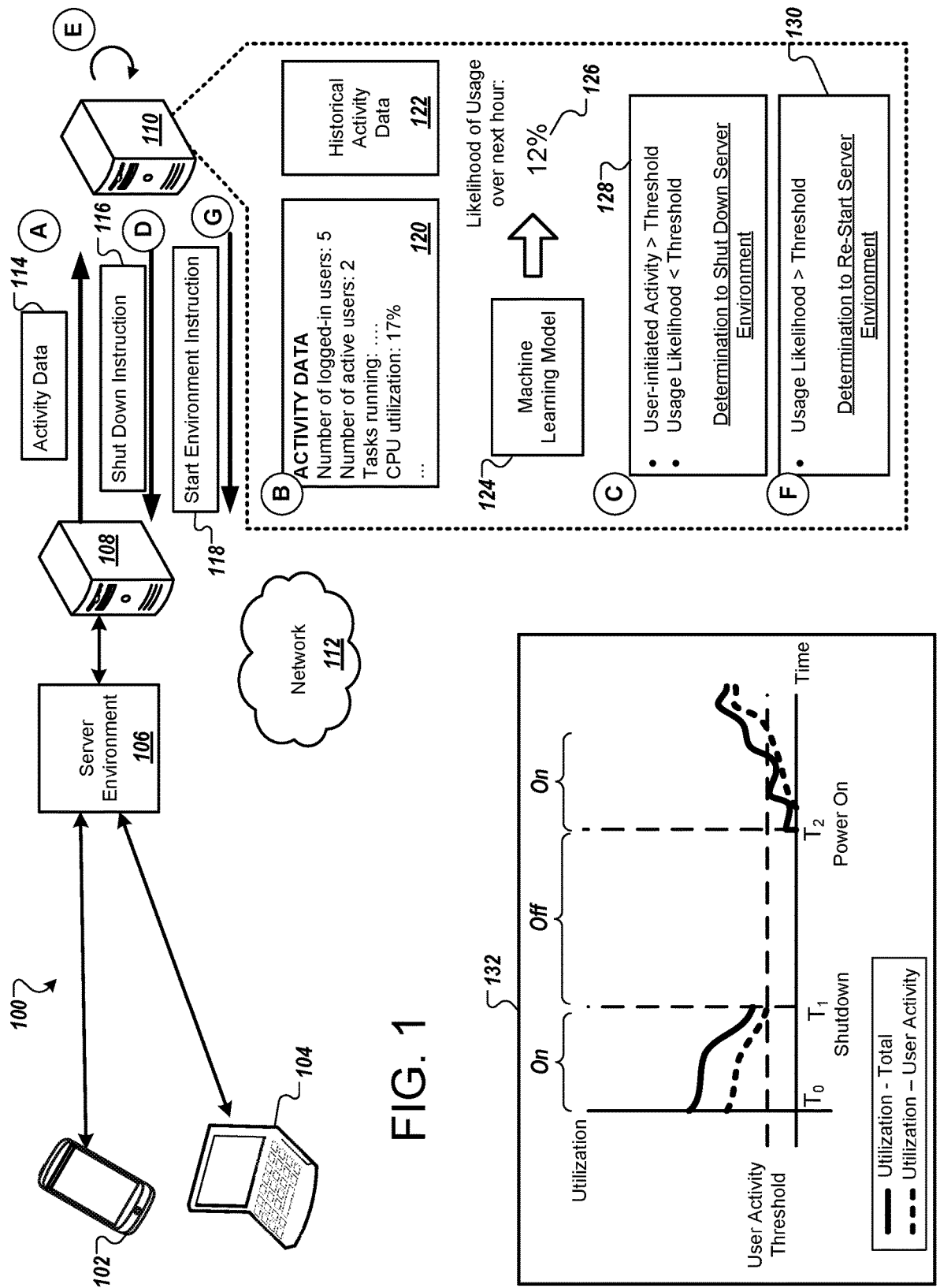
FIG. 1 is a block diagram that illustrates an example of a system for automatic idle environment shut down.

FIG. 1 is a block diagram that illustrates an example of a system 100 for automatic idle environment shut down. The system 100 includes a client device 102, another client device 104, a server environment 106, a computing system 108, a computing system 110, and a network 112.

The computing system 108 can be a server system that hosts or otherwise provides the server environment 106, which can be a software environment that includes applications and/or services to respond to various requests. The server environment 106 may represent the operation of a specific server system (e.g., the software of a specific server), but may similarly represent one of potentially many virtualized environments running on a hardware platform. In some implementations, the server environment 106 is a server environment hosted by a cloud computing platform such as AMAZON WEB SERVICES (AWS), MICROSOFT AZURE, or another cloud computing provider. Accordingly the server environment 106 may represent a virtual machine or a collection of containers running on a host. In some implementations, the server environment 106 is provided by hardware that is directly managed by an organization, such as a local or on-premises server.

In some implementations, the server environment 106 and other server environments discussed herein are hosted by cloud computing platforms. For example, the computing system 108 may represent a cloud computing platform operated by a third party. The computing system 110 can represent a management system that manages server environments for a company or other organization. By communicating with the cloud computing system represented by computing system 108, the computing system 110 can efficiently manage cloud computing resources and predictively avoid running idle cloud-hosted environments, while also not shutting down environments prematurely.

The illustrated system 100 shows the computing system 110 monitoring the activity data of the server environment 106 through the computing system 108. The computing system 108 communicates with the server environment 106 that can communicate with one or more connected client devices, such as client device 102 and client device 104.

In some implementations, the computing system 110 can directly communicate with the server environment 106 without the use of the computing system 108. In other implementations, the computing system 108 is required to communicate status and activity data of the server environment 106 to the computing system 110. FIG. 1 illustrates various operations in stages (A) to (G), which can be performed in the sequence indicated or in another sequence.

In general, the system 100 provides for generating and providing activity instructions to the computing system 108 based on a variety of factors of the server environment 106. The instructions can include whether to restart the server environment 106, power on the server environment 106, or to shut down the server environment 106. The system 100 can determine to provide one of these instructions to the computing system 108 dynamically based on a variety of factors associated with the server environment 106 and the corresponding client devices 102 and 104. For example, the variety of factors can include data such as: the number of users or client devices logged in to the server environment 106; the number of users logged in to the server environment 106 that are currently active; the number of tasks executing on the server environment 106; the number of the current tasks that were initiated due to user action or will cause results to be provided to a user; the CPU utilization and other resource utilization of the server environment 106; historical user activity data for the server environment 106; and other factors about the characteristics, usage, and status of the server environment 106.

The computing system 110 can monitor the variety of factors associated with the server environment 106, and provide data indicative of those factors to its machine learning model 124. These factors can be used to train the machine learning model 124 to predict a likelihood of usage over a predetermined period of time. For example, the machine learning model 124 can be trained to predict a likelihood of an amount of usage over a subsequent period of time. A user can set the subsequent period of time to be, for example, 30 minutes, 1 hour, or 24 hours. Once training of the machine learning model 124 is complete, the computing system 110 can provide the data indicative of those factors to the machine learning model 124 to produce an output indicting a predicted likelihood or level of future usage of the server environment 106. This prediction may apply to a specific time period, such as the next hour. The computing system 110 can then use the predicted likelihood to determine whether to instruct the computing system 108 to restart, shut down, or power on the server environment 106 at a particular time. The system can use the predictions to determine a schedule for starting or stopping environments, to adjust the schedules, or to dynamically decide when to start or stop environments without using any schedule.

In some implementations, the computing system 110 can store the activity data of the server environment 106 in a database for subsequent retrieval. For example, the computing system 110 can store the activity data of the server environment 106, the characteristics of the machine learning model 124 (e.g., such as the weight values of a neural network), and the output prediction by the machine learning model 124 in the database for further operations. These operations can include training and fine-tuning the machine learning model 124 at a later point in time should the machine learning model 124 output an incorrect prediction or training the machine learning model 124 if new situations are encountered by the server environment 106.

In order to ensure that the client devices only use the server environment 106 for the minimum amount of time necessary to perform the requested task, the computing system 110 can monitor current activity and previous activity on the server environment 106 associated with the client devices to determine how long these devices typically use the server environment 106. In some implementations, the computing system 110 can monitor current activity and previous activity on the server environment 106 associated with the client devices to determine whether to shut down or power on the server environment 106. Additionally, the computing system 110 can monitor the current activity and previous activity of the server environment 106 associated with the client devices to predict at a future point in time when client devices will connect or disconnect from the server environment 106. Thus, the computing system 110 can anticipate client device action and minimize overall cost for the client devices for using the services provided by the server environment 106.

Referring to FIG. 1, in the system 100, each of the client devices 102 and 104 can be, for example, a desktop computer, a laptop computer, a tablet computer, a wearable computer, a cellular phone, a smart phone, a music player, an e-book reader, a navigation system, or any other appropriate computing device. The network 112 can be wired or wireless or a combination of both, and can include the Internet. The computing system 108 can represent a single computer or multiple computers, which may be distributed across multiple geographic areas. Similarly, the computing system 110 can represent a single computer of multiple computers, which may be distributed across multiple geographic areas.

A user can interact with each of the computers and client devices shown in system 100. For example, a user can interact with the computing system 110 to set the parameters of the machine learning model 124, set the user activity and usage likelihood threshold levels of the computing system 110, and set the communication protocols between the computing system 110 and the computing system 108. The user can interact with the computing system 110 to communicate with the computing system 108 to see logs that indicate connection requests, disconnections, and utilization of the client devices to the server environment 106. The user can retrieve the logs from the computing system 108 and store the retrieved logs on the computing system 110.

During stage (A), the computing system 110 monitors activity data 114 of the server environment 106. This includes receiving activity data 114 corresponding to connection requests to the server environment 106, utilization of the server environment 106 based on the requests from the client devices (e.g., client device 102 and client device 104), and utilization data corresponding to server environment 106. For example, the activity data 114 executing on the server environment 106 can include one or more jobs, processes, or tasks running on the server environment 106, the types of jobs/tasks executing on the server environment 106, the types of inputs received at the server environment 106, and when the inputs are received at the server environment 106. Additionally, the activity data 114 can include CPU utilization, memory usage, an amount of network bandwidth utilized, an amount of input or output operations, thread count, disk usage, network usage, a level of interactivity between the tasks executing, and GPU usage.

The activity data 114 can be based on user-initiated activity from the client devices or system initiated activity. The computing system 110 can monitor the activity data 114 of the server environment 106 over a period of time, such as a day, one week, or one month, for example. In some implementations, the computing system 110 can determine a portion of the measured user-initiated activity that supports active user sessions that receive user input at a particular rate. The computing system 110 can analyze how often and at what rate the server environment 106 receives input from a client device connected to the server environment. If the rate at which the server environment 106 receives input from a client device is greater than a predetermined threshold, such as a rate of five inputs per minute, then the computing device 110 can deem the user-initiated activity as an active user session. The user currently using the computing device can define the predetermined threshold for the rate at which the server environment 106 receives input from the client device. Alternatively, the computing system 110 can automatically generate the predetermined threshold based on averaging previous rates from historical activity data.

The computing system 110 can communicate with the computing system 108 to retrieve the activity data 114 corresponding to the server environment 106. The computing system 110 communicates over network 112 to the computing system 108. The computing system 110 can also retrieve a time the connection was made to the server environment 106, how long the connection was made before the respective client device or the server environment 106 severed the connection, a portion of the time the session was active, a portion of the time the session was inactive, and which computer of the server environment 106 connected to the client device.

In some implementations, the computing system 110 can retrieve activity data 114 corresponding to the processes performed on the server environment 106. For example, this data can include a number of users logged in to the server environment 106, a number of idle users that are logged in to the server environment 106, a number of currently active user sessions, a number of applications executing corresponding to each client device logged in to the server environment 106, and a type of each of the applications that are executing on the server environment 106. The type of active sessions can include a scheduled activity or a user initiated activity. For example, a scheduled activity can include a recurring virus scan on the computer or a virus scan on the client device 102 performed by the server environment 106. A user-initiated activity can include, for example, an application selected by a user of the client device 102 for performing an online payment or performing an online storage execution. Other data can be gleaned from the server environment 106 to be added to the activity data 114, such as GPU processing data, network processing data, and memory usage information corresponding to each application executing on the server environment 106.

If the computing system 110 cannot determine a user session or a type of the activity performed on the server environment 106, the computing system 110 can verify whether logs are generated in response to or during the execution of the activity. The reports can indicate tasks performed, date of the task performed, the type of tasks performed, how long each task executes, and potentially, one or more issues associated with the execution of the activity.

During stage (B), the computing system 110 evaluates the activity data 114. For example, the computing system 110 determines, from the activity data 114, an amount of the activity on the server environment 106 that is due to user actions. For example, in response to the client device 102 connecting to the server environment 106, the client device 102 may request the server environment 106 execute a particular application. The server environment 106 can spawn one or more applications in a single or multi-threaded environment in response to executing the particular application requested for by the client device 102. The computing system 110 can determine which additional applications are spawned in response to the client device 102 executing a particular application. For example, a user at client device 102 may request the server environment 106 to execute an online payment transaction. The server environment 106 can then initiate a thread that includes applications such as, a bank application, a communication protocol application, and a verification of money transfer application. The computing system 110 can note that each of these applications is executing on the server environment 106 in the activity data 114.

In some implementations, the computing system 110 can also note applications that are executing on the server environment 106 that are not due to user actions, such as system actions. These applications can include applications that are initiated by the processor without the request from the user. For example, these applications can include system updates, system malware review, and cron jobs. By noting the applications that are not user-driven, the computing system 110 can help the machine learning model 124 to focus its processing on application that are, in fact, user driven. Additionally, the machine learning model 124 can identify tasks which are user driven and which tasks are system driven.

The computing system 110 can additionally determine which tasks that execute on the server environment 106 communicate back to the client devices. For example, the computing system 110 can determine from the activity data 114 which applications executing on the server environment 106 communicates back to client device 102. For example, the computing system 110 can determine from the activity data 114 that an application corresponding to an online transaction will communicate back to the client device 102 for verification of the transaction. Thus, the computing system 110 can note the applications that communicate back to the client devices in order to ensure that the machine learning model 124 does not generate a shut down instruction while those applications execute. Alternatively, for the applications that do not require communicating back to the client devices in response to executing the request by the client device, the computing system 110 can ensure that the machine learning model 124 considers this when generating a prediction to shut down or power on the server environment 106.

In some implementations, the computing system 110 can retrieve historical activity data 122 from a database to analyze during the analyzing of activity data 114. The historical activity data 122 can come from the same client device as activity data 114. Alternatively, the historical activity data can come from similar client devices to the client device that reported activity data 114. The historical activity data can be retrieved before the current measuring period corresponding to the time when the activity data 114 is retrieved. For example, the historical activity data can be retrieved from various time periods before the current measuring period, such as one year before the current measuring period or 1 month before the current measuring period. Additionally, the historical activity data can be retrieved from a particular time period, such as during the month of April 2017.

The computing system 110 can retrieve historical activity data 122 for a particular client device, such as client device 102, over a particular time period. Alternatively, the computing system 110 can retrieve historical activity data 122 for each client device that connected to the server environment 106 over a particular time period. The time periods for retrieving historical activity data 122 can range over particular intervals, such as during 6:00 AM to 6:00 PM over each day of the month of October 2017. In some implementations, the computing system 110 can retrieve historical activity data 122 during time periods in which the server environment 106 previously received a high number of connection requests or a low number of connection requests from client devices.

The computing system 110 can use this historical activity data 122 to train the machine learning model 124 to recognize when to power on the server environment 106 in the likelihood that the server environment 106 will receive a high number of connection requests from client devices during that times. Additionally, the computing system 110 can retrieve historical activity data 122 during time periods in which the server environment 106 was expected to receive a high number of connection request from client devices, but in fact, received a low number or no connection requests from client devices. This historical activity data 122 can be used to train the machine learning model 124 to more accurately predict when the server environment 106 will receive connection requests from client devices.

In other implementations, the computing system 110 can retrieve historical activity data 122 during time periods in which the server environment 106 previously received a low number of connection requests from client devices. The computing system 110 can use this historical activity data 122 to train the machine learning model 124 to recognize times when to shut down the server environment 106 in the likelihood that the server environment 106 will not receive connection requests from client devices during those times. Additionally, the computing system can retrieve historical activity data 122 during time periods in which the server environment 106 was not expected to receive a high number of connection requests from client devices, but in fact, received a high number of connection requests from client devices. This historical activity data 122 can be used to train the machine learning model 124 to more accurately predict when the server environment 106 will receive connection requests from client devices.

The historical activity data 122 can include data similar to the activity data 114. As previously mentioned, the historical activity data 122 can include activity data over a predetermined period of time corresponding to a particular client device or multiple client devices. For example, the historical activity data 122 can include one or more jobs or processes running on the server environment 106 over a period of 1 month, a type of each of these jobs or processes, the CPU usage, the memory usage, thread count, disk usage, network usage, and GPU during this time period.

In some implementations, the historical activity data 122 can include metadata that describes the historical activity data. For example, the metadata can include the prediction made by the machine learning model 124 during this time period, the number of connection requests, data describing the client device that corresponds to the historical activity data, and a timestamp corresponding to the time period of the historical activity data. In some implementations, a user may embed the metadata in the historical activity data 122. In other implementations, the computing system 110 embeds the metadata in the activity data 114 before storing the activity data in the database.

In some implementations, the computing system 110 provides the analyzed activity data 120 (e.g., generated from the activity data 114 with the embedded metadata and other analyzations) and the historical data 122 to the machine learning model 124. The machine learning model 124 may include one or more neural network layers that are trained to predict a usage likelihood 126 of usage of the server environment 106. The usage likelihood 126 can be a percentage or a number indicating how likely the server environment will be used over a predetermined time period. For example, as illustrated in system 100, based on the analyzed activity data 120 and the historical activity data 122, the machine learning model 124 outputs data indicating a likelihood of 12% that the server environment 106 will be used over the next hour.

In some implementations, the predicted likelihood can include an indication that future use of at least a minimum level will occur over a particular period of time in the future. For example, the likelihood of 12% can indicate that at least a minimum level of 12% of future use of the server environment 106 will occur over the next hour. This can also include an indication that only half of the likelihood (e.g., 6%) is the minimum level of future use of the server environment 106 that will occur over the next hour.

The machine learning model 124 can also provide an indication of a predicted time when the use of the server environment 106 is expected to reach a particular level. For example, the machine learning model 124 can produce a likelihood 126 of 30% over the next three hours. Additionally, the machine learning model 124 can indicate at usage level at different times over the next three hours. For example, at hour 1, the usage level is expected to be 15%, at hour 2, the usage level is expected to be 30%, and at hour 3, the usage level is expected to be 25%. The machine learning model 124 can perform this mapping of usage level to times and provide the mappings to a user for review. Alternatively, the machine learning model 124 can indicate that the usage level of 30% is expected to be the same level across the span of three hours, for example.

In some implementations, a user can set the predetermined time period for the machine learning model 124. The predetermined time period, can be, for example, 1 hour, 2 hours, or 1 day. Alternatively, the predetermined time period can be automatically generated by the computing system 110. The computing system 110 can generate the predetermined time period by analyzing a time period of historical activity data 122 that indicates the highest region of users providing connection requests and/or utilizing the server environment 106.

In response to generating the usage likelihood 126, the computing system 110 stores data corresponding to the predicted usage likelihood 126 in the database. The data corresponding to the predicted usage likelihood 126 includes the analyzed activity data 120, the historical activity data 122 and corresponding metadata, characteristics of the machine learning model 124, and the predicted usage likelihood 126 itself. The computing system 110 can store this data corresponding to the predicted usage likelihood 126 for retraining the machine learning model 124 at a later point in time.

In some implementations, the machine learning model 124 acts as a classifier and produces an indication of whether to shut down or power-on the server environment 106 instead of producing a usage likelihood 126. For example, the machine learning model 124 would output a label that indicates "Shut Down" or "Power On." The final neural network layer of the machine learning model 124 can perform additional processing to convert a likelihood generated by one or more hidden layers of the machine learning model 124 to a classification label.

During stage (C), the computing system 110 applies one or more thresholds, e.g., usage likelihood threshold and user activity threshold, to the usage likelihood 126 of the server environment 106 to determine whether criteria for shut down or power on are satisfied. The computing system 110 uses the one or more thresholds to improve the accuracy of the machine learning model 124's prediction. Thus, the computing system 110 can use a usage likelihood threshold to compare to the output of the machine learning model 124's prediction. For example, if the predicted usage likelihood 126 is less than the usage likelihood threshold set by the computing system 110, then the computing system 110 can generate a "Shut Down" command. Alternatively, if the predicted usage likelihood 126 is greater than the usage likelihood threshold set by the computing system 110, then the computing system 110 can generate a "Power On" command. The computing system 110 can generate a "Restart" command if the server environment 106 is already powered on. Alternatively, the computing system 110 may not generate a "Restart" command if the server environment 106 is already powered on and is connected to one or more client devices.

In some implementations, the computing system 110 may apply other thresholds to the analyzed activity data 120 before generating the instruction to provide to the server environment 106. For example, the computing system 110 may compare activity types from the analyzed activity data 120 to one or more thresholds. If the number of activity types that are user initiated is greater than a threshold, then the computing system 110 can generate a "Power On" or "Restart" command. In another example, if the CPU utilization of the server environment 106 is greater than a predetermined utilization threshold, then the computing system 110 can generate a "Power On" or "Restart" command.

The computing system 110 can rely on other data from the analyzed activity data 120 to compare to threshold values. Thus, the computing system 110 can rely on both the threshold comparison to the usage likelihood 126 and the threshold comparison to the data from the analyzed activity data 120. For example, as illustrated in system 100, the module 128 shows the computing system 110 applying multiple threshold comparisons to various data types before making its determination whether to power on or shut down the server environment 106. For example, module 128 shows the computing system 110 determining that the usage likelihood 126 generated by the machine learning model 124 is less than the usage likelihood threshold. Additionally, the computing system 110 determines that the number of activity types that are user initiated is greater than a threshold. Thus, from these threshold comparisons, the computing system 110 determines to shut down the server environment 106.

Alternatively, if the computing system 110 determined that the usage likelihood 126 is greater than the usage likelihood threshold, then the computing system 110 can determine to power on or restart the server environment 106. The computing system 110 can store the results of the comparison and corresponding usage likelihood threshold value in a database for retraining the machine learning model 124 at a later point in time.

In some implementations, the computing system 110 can also check the status of the server environment 106 before generating an instruction to provide the server environment 106. For example, if the computing system 110 determines using its machine learning model 124 that the server environment 106 needs to be powered on, then the computing system 110 can determine whether the server environment 106 is already powered on. If the computing system 110 determines the server environment 106 is already powered on, the computing system 110 can then generate a "Restart" command to provide to the server environment 106, rather than a "Power On" command. The "Restart" command can be generated if no client devices are connected to the server environment 106. In other cases, the computing system 110 may not provide any instruction to the server environment 106 if the server environment 106 is powered on and client devices are connected to the server environment 106. A "Restart" command may disconnect client devices from the server environment 106 and cease an application the user intended to execute.

In some implementations, administrators monitoring the computer system 110 can provide feedback to the computer system 110 based on its decision-making. For example, administrators can provide ratings to the computer system 110 based on actions of the computer system 110. The ratings can indicate whether the actions of the computer system 110 were correct or incorrect. Based on the ratings provided by the administrator, the computer system 110 can retrain its machine learning model 124 if the computer system 110's actions were incorrect.

During stage (D), the computing system 110 sends an instruction to the computing system 108 causing the server environment 106 to perform the action included within the instruction. The computing system 110 can provide the instruction to the computing system 108 over the network 112. For example, the computing system 110 can provide an instruction 116 to the computing system 108 that instructs the server environment 106 to shut down. Alternatively, the computing system 110 can provide an instruction to the computing system 108 that instructs the server environment 106 to power on or restart, based on a status of the server environment 106. In some implementations, the computing system 110 can provide the instruction directly to the server environment 106 over the network 112, without providing the instruction to the computing system 108.

In some implementations, the instruction can include an indication of which computers at the server environment 106 to shut down or power on. As previously mentioned, the server environment 106 can include one or more computers connected locally or connected over a network. When a client device, such as client device 102, connects to the server environment 106, the client device 102 may particularly only require using two of the ten computers located at the server environment 106, for example. The computing system 110 may instruct the remaining eight computers at the server environment 106 to power down while the client device 102 utilizes the remaining two computers. This conserves resources at the server environment 106.

Before the computing system 108 shuts down the server environment 106 or one or more computers of the server environment 106, the computing system 108 stores a current state information corresponding to the server environment 106 in memory. For example, the computing environment stores, in non-volatile memory, state information that comprises data corresponding to one or more tasks executing at the server environment 106, memory contents stored at the server environment 106, and connections made to the server environment 106 at the server environment 106. Such that, at a later point in time, when the server environment 106 is restarted or powered on, the computing system 108 can load the current state information on the server environment 106. Thus, the server environment 106 can resume the one or more tasks that were running before the server environment 106 was shut down.

By powering down computers not in use at the server environment 106, the server environment 106 conserves resources, such as hardware resources that may be reallocated to other environments, and minimizes its power consumption. For example, the shut down instruction 116 may indicate to the computing system 108 to power down two nodes (e.g., two computers) of the server environment 106 for the next hour. Alternatively, the computing system 110 may instruct only one of the computers of the server environment 106 to power on based on a prediction from the machine learning model 124 that a single client device is predicted to utilize the server environment over the next hour.

During stage (E), the computing system 110 periodically determines a usage likelihood for the server environment 106 and determines when the usage likelihood reaches a minimum threshold value. In some implementations, the computing system 110 polls the server environment 106 at periodic intervals to monitor its status. For example, the computing system 110 polls the server environment 106 every minute, every five minutes, every 15 minutes, every hour, every five hours, or at another rate, to name a few examples. The computing system 110 polls the server environment 106 at periodic intervals to retrieve activity data 114 from the server environment 106, e.g., data indicating current load levels, numbers of users who are active, numbers of tasks being processed, and so on. For example, the computing system 110 communicates with the computing system 108 to retrieve the activity data 114 from the server environment 106. When server environment 106 is shut down, the computing system 110 uses various types of context, e.g., the time of day, errors, failed attempts by users to connect with the server environment 106, and so on to determine a usage likelihood for the server environment 106. Then, the computer system 110 provides the context information to the machine learning model 124 to produce predictions on a periodic basis, and these predictions can be used to determine when to turn on the server environment 106 after it has been shut down.

Each time the activity data 114 is retrieved from the server environment 106, the computing system 110 stores a copy of the activity data 120 in the database. Thus, the activity data 114 stored in the database can be used at a later point in time for potentially re-training the machine learning model 124. Additionally, the computing system 110 analyzes and evaluates the activity data 114. The computing system generates the analyzed activity data 120 from the activity data 114 by embedding metadata into the activity data 120 that includes a type of the task, a computing device in the server environment 106 performed the task requested for by the user, a number of users logged in to the server environment 106, and a number of users logged in to the server environment 106 that are active, to name a few examples. The computing system 110 then retrieves historical activity data 122 from the database that includes previous activity data 114 over various periods of time from the server environment 106. Using the retrieved historical activity data 122 and the analyzed activity data 120 as input to the machine learning model 124, the machine learning model 124 outputs data indicating a likelihood of usage over the next predetermined time period.

For example, the machine learning model 124 generates the usage likelihood 126 to indicate a predicted level of usage over the next predetermined time period, such as an hour. The machine learning model 124 may generate a usage likelihood 126 of 70% indicating that the server environment 106 is expected to experience usage of at least a minimum amount over the next hour. The computing system 110 can store the generated usage likelihood 126 along with the analyzed activity data 120 and the historical activity 122 in the database for retrieving later in further training the machine learning model 124.

During stage (F), the computing system 110 determines that the usage likelihood 126 is sufficiently high to justify providing the server environment 106, so the computing system 110 determines to restart or power on the server environment 106. The computing system 110 compares the usage likelihood 126 to the usage likelihood threshold. For example, the usage likelihood threshold can be a percentage. In response to comparing the usage likelihood 126 to the usage likelihood threshold, the computing system 110 can determine that the usage likelihood 126 of 70%, for example, is greater than the usage likelihood threshold of 50%. For example, module 130 compares the usage likelihood 126 to the usage likelihood threshold. In response, the computing system 110 generates an instruction to power on the server environment 106 since it is 70% likely that a client device will use the one or more computers at the server environment 106. The computing system 110 can generate a power on instruction instead, if the server environment 106 is currently powered off. The computing system 110 may not generate a restart instruction if one or more client devices are currently connected to the server environment 106. The generated instruction can be a message, a text file, a binary representation of a power on instruction, or other data representing a power on instruction.

During stage (G), the computing system 110 sends an instruction to the computing system 108 causing the server environment 106 to power on the server environment 106. Stage (G) is similar to stage (D), in that instructions are sent from the computing system 110 to the server environment 106. The instruction to the computing system 108 is provided over the network 112. In response to the computing system 108 receiving the instruction, the computing system 110 restarts or powers on the server environment 106. In some instances, the computing system 110 restarts or powers on at least one of the computers of the server environment 106 based on the predicted likelihood generated by the machine learning model 124.

In some implementations, the computing system 110 generates an instruction to power on, restart, or power off one or more computers of the server environment 106 based on the usage likelihood 126. The higher the usage likelihood generated by the machine learning model 124, the more likely more computers may be required at the server environment, and consequently, the more computers the computing system 110 will instruct the server environment 106 to power on or restart. For example, if the computing system 110 determines that the usage likelihood 126 is greater than the usage likelihood threshold, the computing system 110 can then determine how many computers of the server environment 106 to turn on or restart. If the usage likelihood 126 is between 100% and 90%, for example, then the computing system 110 can instruct the computing system 108 to power on each of the computers at the server environment 106. If the usage likelihood 126 is between 89% and 80%, the computing system 110 can instruct the computing system 108 to power on half of the computers of the server environment 106. Additionally, if the usage likelihood 126 is less than 80% (while still being greater than the usage likelihood threshold), the computing system 110 can instruct the computing system 108 to power on one or two of the computers of the server environment 106. Other ranges and corresponding amount of computers to turn on or shut down is possible. A user interacting with the computing system 110 or the computing system 108 can set the percentages and number of computers to power on at the server environment 106. Alternatively, the user can indicate that each of the computers at the server environment 106 power on each time the usage likelihood 126 is greater than the usage likelihood threshold.

Over a period of time, the computing system 110 can power on and off the server environment 106 based on user activity utilization of the server environment 106, total utilization of the server environment 106, and a user activity threshold. For example, visualization 132 depicts how the server environment 106 operates. As shown in visualization 132, the computing system 110 can predict using its machine learning model 124 from time 0 to time $T_1$, the server environment 106 is to be powered on; from time $T_1$ to time $T_2$ the server environment 106 is to be powered off, and after time $T_2$ the server environment 106 is to be powered on.

The computing system 110 can transmit an instruction to the computing system 108 to power off the server environment 106 at time $T_1$ until time $T_2$. At time $T_2$, the computing system 108 can automatically power on the server environment 106. Alternatively, the computing system 110 can transmit an instruction to the computing system 108 to power on the server environment 106 at time $T_2$. Based on the trend of user activity utilization and the total utilization from time $T_0$ to after time $T_2$ as shown in visualization 132, the computing system 110 correctly predicted when to power off on power on the server environment 106.

As shown from time $T_0$ to time $T_1$, the total utilization and the user activity utilization of the server environment 106 is greater than the user activity threshold. Once the user activity utilization dips below the user activity threshold, as shown at time $T_1$, the computing system 110 instructs the server environment 106 to shut down from time $T_1$ to time $T_2$. The computing system 110 instructs the server environment 106 to shut down based on the indication that the user activity utilization is below the user activity threshold during time $T_1$ to time $T_2$. During the time after time $T_2$, the user activity utilization and the total utilization slowly begin to increase until the utilization crosses the user activity threshold indicating that the usage on the server environment 106 is increasing.

Various techniques can be used to train machine learning models. When server environments are automatically stopped and restarted, there will be periods of unavailability for stopped environments. Data indicating how user requests line up with periods of unavailability can be used to fine-tune the predictions and commands of the system. When a user or client device attempts to access a shut-down server environment, the request can be considered to be an "out-of-band" request. The computing system 110 can detect when out-of-band requests are performed, e.g., when user-initiated requests are sent while the server environment 106 is unavailable due to the computing system 110's instruction. The timing of the requests and the previous and subsequent load levels of server environment can be used to update the training of machine learning models to keep the server environment active to capture more requests similar to out-of-band requests detected.

As another example, the computing system 108 may receive a notification from the computing system 110 that the server environment 106 is shut down for the next five hours. The computing system 108 can execute shutting down the server environment 106. However, after two hours have passed, the computing system 108 determines that the server environment 106 has received multiple connection requests from client device 102 and client device 104, opposite to the prediction generated by the machine learning model 124 at the computing system 110. The computing system 108 can log these receipts from the client devices and log the disparity between the prediction and the actual connection requests from the client devices. In response, the computing system 108 can transmit a notification of the disparity to the computing system 110 to further train its machine learning model 124.

The computing system 110 can refine its machine learning model 124 to correct for the incorrect prediction of shutting down the server environment 106 when multiple connection requests were received from the client devices. For example, the computing system 110 can provide the data used by the machine learning model 124 to generate the prediction that the server environment 106 is not expected to receive the connection request from one or more client devices over the next hour, an indication that an out-of-band request was received during this hour period, and data used to modify the characteristics of the machine learning model 124 to generate the correct prediction. The correct prediction includes an indication that at least one request will be received by the server environment 106 during the five hour long period.

In another example, the computing system 108 may receive a notification from the computing system 110 that the server environment 106 is to power on because the server environment 106 is expected to receive a connection request from one or more client devices over the next hour. However, after the hour has passed, the computing system 108 determines that the server environment 106 did not receive a single connection request from a client device, opposite to the prediction generated machine learning model 124 at the computing system 110. The computing system 108 can log these this notification of the disparity between the computing system 110's instruction and in response, transmit the notification of the disparity to the computing system 110 to further train its machine learning model 124.

The computing system 110 can retrain its machine learning model 124 to correct for the erred prediction of power on the server environment 106 when no connection requests were received from the client devices. Similar to the previous example, the computing system 110 can provide the data used by the machine learning model 124 to generate the prediction that the server environment 106 is expected to receive connection requests during the time period, an indication that no requests were received during the time period, and data used to modify the characteristics of the machine learning model 124 to generate the correct prediction. The correct prediction includes an indication that no requests will be received during the time period.

In some implementations, the computing system 110 predicts whether to shut down or power on the server environment 106 for a predetermined period of time in order to reduce the amount of time the client devices connect to the server environment 106. The client devices may have to pay money to the server environment 106 or another third party system in order to use the services provided by the server environment 106. The services can include online storage, online payment, or foreign language translation, to name a few examples.

Figure 2:
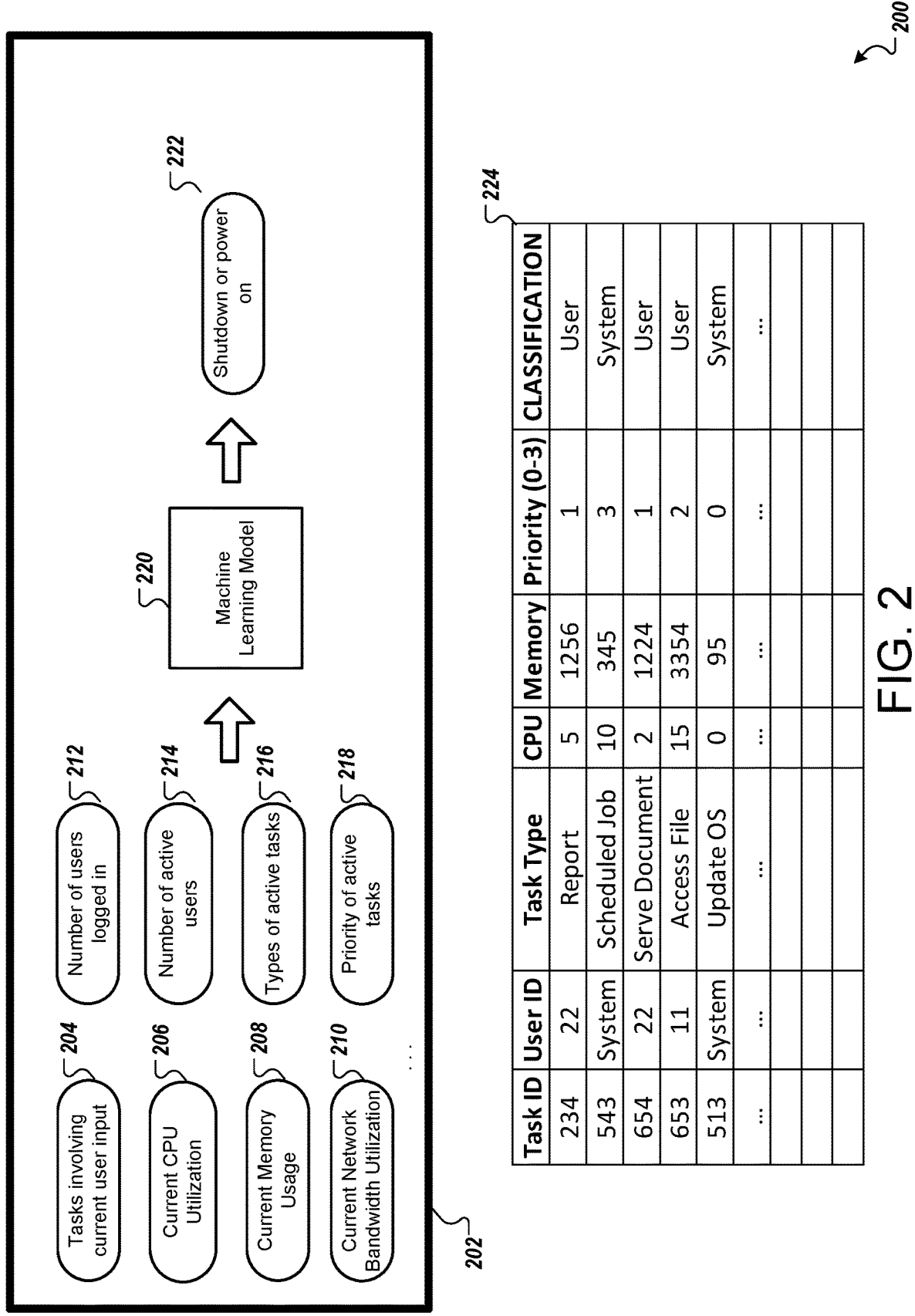
FIG. 2 is a diagram that illustrates an example of monitoring the characteristics of the server environment to generate a power command.

FIG. 2 is a diagram that illustrates an example of a system 200 for monitoring the characteristics of the server environment to generate a power command. The system 200 occurs on the computing system 110. The module 202 included in system 200 illustrates the various inputs to provide to a machine learning model 220 for training and implementation.

For example, the computing system 110 retrieves activity data 114 from the server environment 106. The activity data 114 is parsed and analyzed into different data sets. For example, as illustrated in system 200, the data sets can include tasks involving current user input 204, current CPU utilization 206, current memory usage 208, and current network bandwidth utilization 210. Additionally, the data sets can include a number of users logged in 212, a number of active users 214, a type of active tasks 216 and a priority level of active tasks 218. The computing system 110 can additionally include historical activity data retrieved from a database to provide to the machine learning model 220. Other data sets can be provided to the machine learning model 220, such as GPU processing utilization and data indicative of reports generated from the activities.

The machine learning model 220 can generate data that represents a likelihood of usage at the server environment 106. The data representing the likelihood of usage can be a percentage or a number from 0 to 100, for example. The computing system 110 can compare the data representing the likelihood of usage to a usage likelihood threshold to determine an instruction 222, to either shut down or power on the server environment 106. In some implementations, the machine learning model 220 can be a classifier that outputs an indication of whether to shut down or power on the server environment 106.

In some implementations, the training of the machine learning model 220 can be performed by the computing system 110. The computing system 110 can use one or more techniques to train the machine learning model 220 to generate a prediction of usage at the server environment 106. For example, the computing system 110 can provide the data sets 204 through 218 and others to the machine learning model 220 to generate an output likelihood that matches a known output. The computing system 110 can retrieve historical activity data 122 that indicates a 100% usage data over a one-hour period on a particular day. The computing system 110 can provide the historical activity data 122 as training data to the machine learning model 220 and compare its output to the 100% usage data over the one-hour period. If the computing system 110 determines the machine learning model 220 does not output a 100% usage data likelihood from historical activity data 122, then the computing system 110 adjusts the characteristics of the machine learning model 220 and reapplies the historical activity data 122 as input until the machine learning model 220 outputs a 100% usage data likelihood. The computing system 110 iteratively performs this process on the machine learning model 220 with each historical activity data 122 stored in the database.

During implementations, the computing system 110 can provide the analyzed activity data 120 (e.g., from the activity data 114) to the trained machine learning model 220 to generate a likelihood of usage over a subsequent predetermined time period. In some implementations, the analyzed activity data 120 can be data sets 204 through 218 analyzed over the current time. The likelihood of usage can be compared to one or more thresholds, e.g., user activity threshold and usage likelihood threshold, to generate a shut down, power on, or restart command to provide to the server environment 106.

Table 224 can include the activity data corresponding to the server environment 106. The table 224 can be retrieved by the computing system 110 from the server environment 106. The table 224 can include a task ID, a user ID, a task type, CPU utilization, memory utilization, a priority ranking, and a classification. For example, the first row of table 224 includes a task ID of 224, a user ID of 22, and a task type of a report. Additionally, task ID 234 consumes 5% CPU utilization, memory consumption of 1256 bytes, a priority ranking of 1, and classification of the actor that initiated the task, such as the user. The processor of the server environment 106 can designate the task ID, the user ID, and the task type. The CPU utilization can include a percentage or a number. In some implementations, the memory utilization can instead be a memory address where the task takes place in the memory of the server environment 106. The priority ranking indicates to the CPU a priority of importance in completing the task.

Figure 3A:
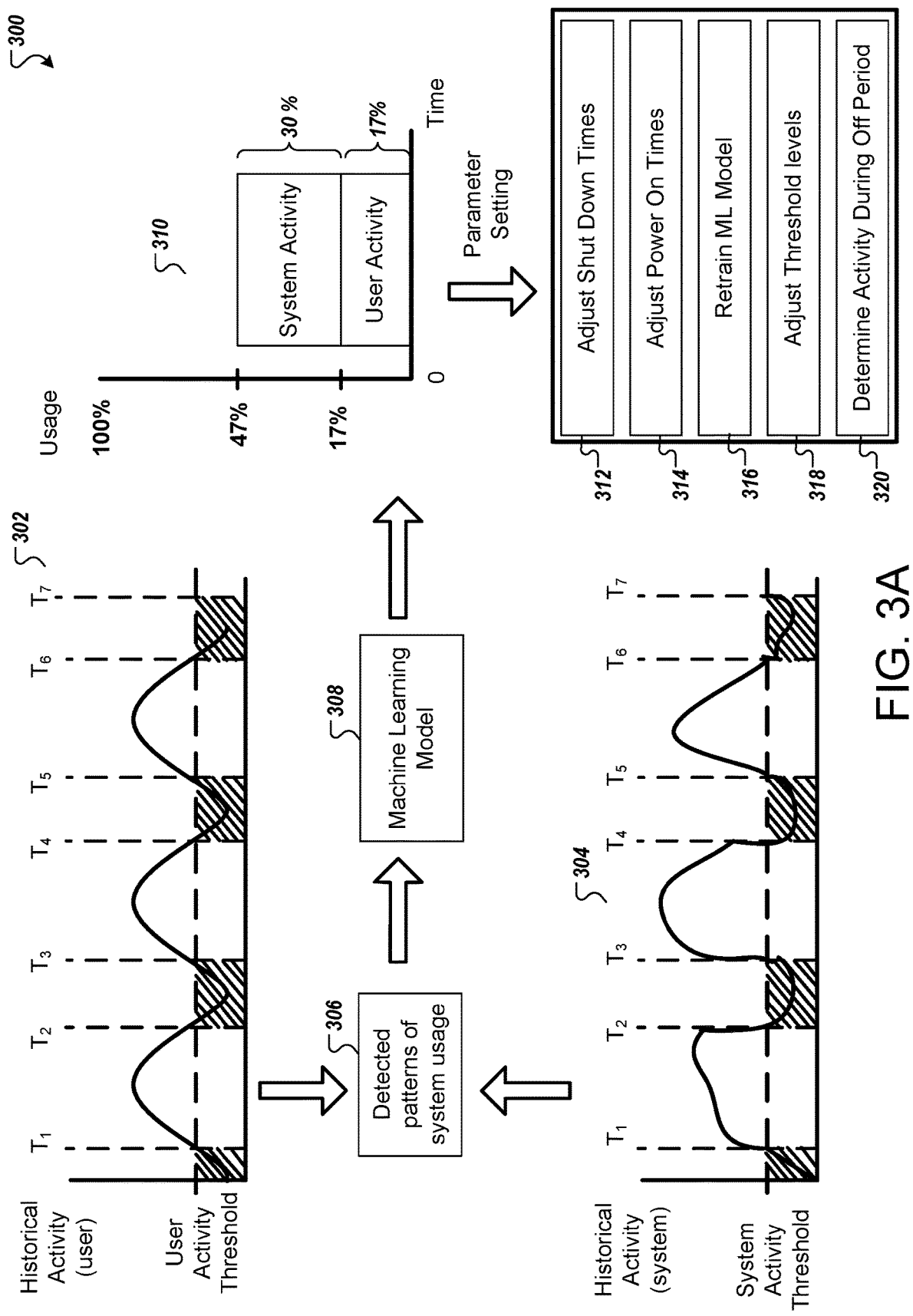
FIG. 3A is a diagram that illustrates an example of monitoring user activity and system activity of the server environment.

FIG. 3A is a diagram that illustrates an example of a system 300 for monitoring user activity and system activity of the server environment. As illustrated in system 300, visualizations 302 and 304 illustrates historical user activity and historical system activity, respectively. For example, these visualizations can be displayed to the user interfacing with the computing system 110. As shown in visualization 302, from time 0 to time $T_7$, the user activity changes in a cyclical pattern. From times 0 to $T_1$, $T_2$ to $T_3$, $T_4$ to $T_5$, and $T_6$ to $T_7$ an amount of user activity at the server environment 106 is below the user activity threshold. Similarly, from times $T_1$ to $T_2$, $T_3$ to $T_4$, and $T_5$ to $T_6$, an amount of user activity data 114 at the server environment 106 is above the user activity threshold.

As shown in visualization 304, the system activity from time 0 to time $T_7$ is not a cyclical pattern, but random. However, from times 0 to $T_1$, $T_2$ to $T_3$, $T_4$ to $T_5$, and $T_6$ to $T_7$ an amount of system activity at the server environment 106 is below the system activity threshold. Similarly, from times $T_1$ to $T_2$, $T_3$ to $T_4$, and $T_5$ to $T_6$, an amount of system activity at the server environment 106 is above the system activity threshold. The system activity threshold is different from the user activity threshold.

The computing system 110 can detect patterns 306 in the user activity and the system activity and provide those patterns 306 to the machine learning model 308. For example, the patterns 306 can include a frequency of activity (e.g., system and user) being above a system activity threshold, frequency of activity being below the system activity threshold, the types of activity, amount of activity at any given time, and how the user activity corresponds to the system activity.

The user activity shown in the visualization 302 can include an amalgamation of application activity that is initiated by a user. For example, this can include CPU utilization, memory utilization, GPU utilization, network bandwidth utilization, and thread count corresponding to user initiation of an application. The user-initiated activity can be analyzed over a predetermined period of time, such as a day, a week, or a month. The system activity shown in the visualization 304 can include an amalgamation of application activity that is initiated by the server environment 106 without user initiation. For example, the system initiated activity can include similar characteristics to that of the user activity but corresponds to system initiation of an application or process.

The computing system 110 provides the detected patterns 306 to the machine learning model 308. The computing system 110 can provide the detected patterns 306 to train the machine learning model 308 to output a likelihood of usage at the server environment 106. Alternatively, the detected patterns 306 can be provided to the machine learning model 308 to output a likelihood of usage at the server environment 106 during its implementation. In some implementations, the machine learning model 308 can output a prediction of likelihood corresponding to the user usage and a prediction of likelihood corresponding to the system usage based on the input provided. For example, if the computing system 110 provides a detected pattern 306 of system usage, the computing system 110 can output a likelihood of system usage at a later point in time. Similarly, if the computing system 110 provides a detected pattern 306 of user usage, the computing system 110 can output a likelihood of user usage for a later point in time. The result of likelihoods of both system and user activity can be plotted on a graph, such as graph 310. The machine learning model 308 can output an indication of 30% likelihood of system usage over the next hour and output an indication of 17% of user usage over the next hour. The computing system 110 can compare each indication of usage (e.g., user and system) to one or more thresholds, e.g., user activity threshold, system activity threshold, and usage likelihood threshold, to determine whether to shut down, power on, or restart the server environment 106.

During training, once the machine learning model 308 generates the likelihood of the system or user usage, the computing system 110 can take one or more additional steps to improve the prediction of the machine learning model 308. The computing system 110 can adjust shut down times 312, adjust power on times 314, retrain the machine learning model 316, adjust threshold levels, and determine activity during off period 320. For example, adjusting shut down times 312 can include adjusting when to shut down the server environment 106 and how long to shut down the server environment 106. The computing system 110 can adjust the shut down times in response to determining how often the computing system 110 has shut down the server environment 106 in the past and if any out-of-band requests were received during that shut down period. The computing system 110 can adjust the shut down times to reduce the amount of out-of-band requests are received during a shut down period.

Adjusting power on times 314 can include adjusting when to power on the server environment 106, how long to keep the server environment 106 powered on, and whether to restart the server environment 106 if already powered on or to power on the server environment 106 if the server environment 106 is turned off. The computing system 110 can adjust the power on times in response to determining how often the computing system 110 has powered on the server environment 106 in the past and not received any requests from client devices to connect. The computing system 110 can adjust the power on times to reduce the amount of opportunities the server environment 106 remains idle when powered on. Thus, the computing system 110 can improve its ability to predict when to shut down and power on the server environment 106.

As previously mentioned, the computing system 110 can retrain the machine learning model 308. The computing system 110 may retrain the machine learning model 308 to improve its prediction ability by correcting for erred predictions. For example, receiving out-of-band requests during a powered off server environment 106, not receiving any requests during a powered on server environment 106, or to adjust the settings of the machine learning model 308 to generate more accurate predictions.

In some implementations, the computing system 110 may train a separate machine learning model for different server environments 106. For example, a machine learning model 308 may be trained for a first server environment and another machine learning model may be trained for a second server environment. By training a particular machine learning model for a corresponding server environment, the machine learning model can be more accurate in predicting when to shut down or power on the corresponding server environment. Alternatively, if the computing system 110 trains a single machine learning model for various server environments, the single machine learning model may require a longer training period. Additionally, the single machine learning model may not generate accurate predictions for various server environments.

The computing system 110 can also adjust threshold levels 318. In some implementations, the computing system 110 can adjust the values of the user initiated activity threshold and the usage likelihood threshold. A user may adjust the values of each of the thresholds to ensure the computing system 110 is more accurate or less accurate in its predictions. A user may adjust the values of the thresholds to be less accurate in order to gather data for future training of the machine learning model 308. Additionally, the computing system 110 can determine activity during off periods 320. As previously, activity during off periods 320 can include out-of-band requests while the server environment 106 is powered off.

Figure 3B:
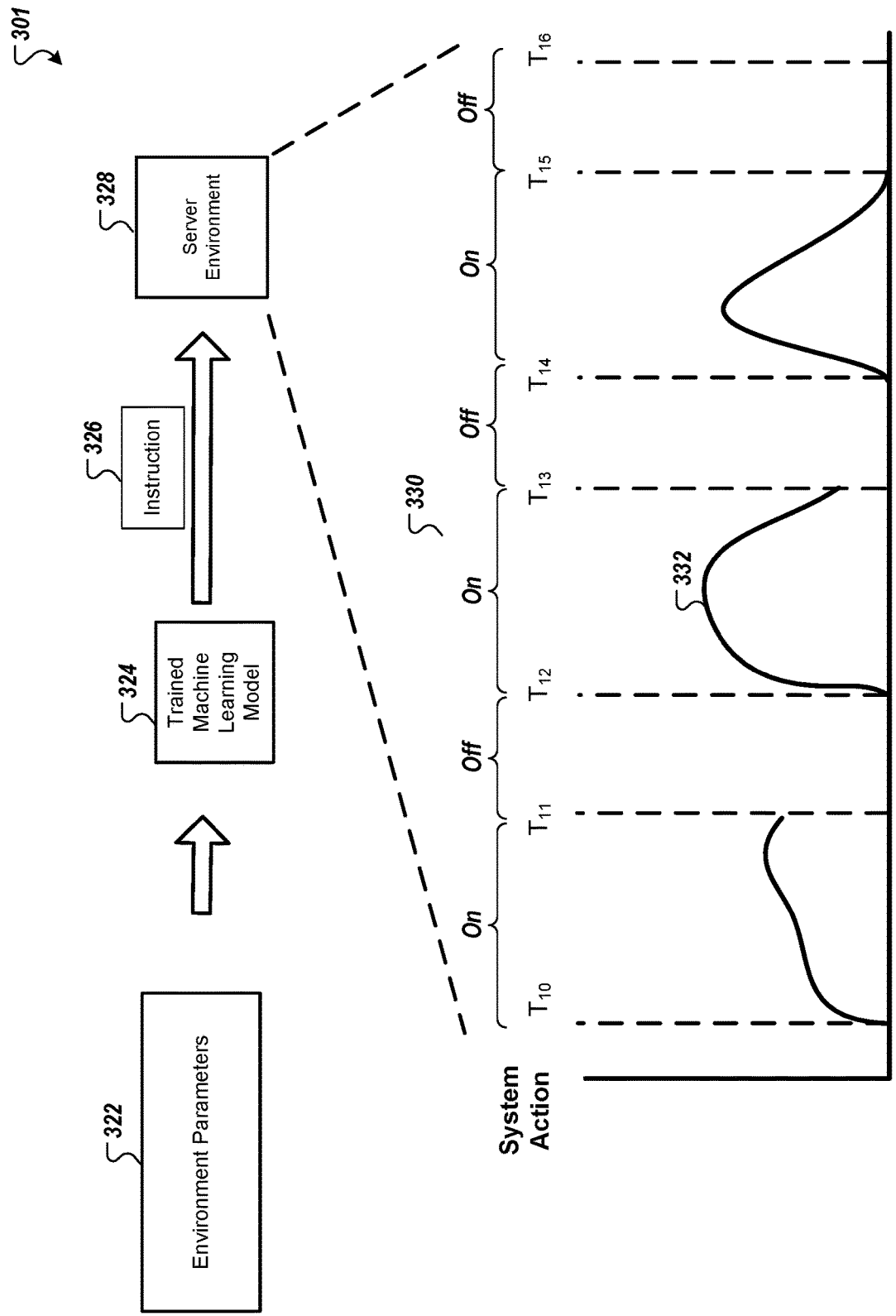
FIG. 3B is a diagram that illustrates an example generating a power command using a trained machine learning model.

FIG. 3B is a diagram that illustrates an example of a system 301 for generating a power command using a trained machine learning model 324. The system 301 can occur on the computing system 110. Once the computing system 110 finishes training the machine learning model 308 from system 300, the computing system 110 can implement a trained version of the machine learning model 324 in practice. For example, as illustrated in system 301, the computing environment 101 provides environment parameters 322 to the trained machine learning model 324.

The environment parameters 322 include the data from the analyzed activity data 120, from system 100. For example, the environment parameters 322 can include tasks involving current user input, current CPU utilization, current memory usage, current network bandwidth utilization, number of users logged in, number of active users, types of active tasks, and priority of active tasks. Other inputs can be provided, such as patterns of user usage and system usage over a period of time, as well as a number of users that are currently logged in the server environment 106 but not active.

The trained machine learning model 324 can output a likelihood of usage over a subsequent predetermined period of time. The computing system 110 can compare the likelihood of usage to one or more predetermined thresholds, e.g., user activity threshold or usage likelihood threshold. Based on the comparison of the likelihood of usage to the predetermined threshold, the computing system 110 generates an instruction 326 to provide to the server environment 328. For instance, the computing system 110 generates an instruction to power down the server environment 328 if the likelihood of usage is less than the predetermined threshold. Alternatively, the computing system 110 generates an instruction to restart or power on the server environment 328 if the likelihood of usage is greater than the predetermined threshold.

As illustrated in system 301, the server environment 328 has a pattern of usage illustrated by visualization 330. For example, from times $T_{10}$ to $T_{11}$, $T_{12}$ to $T_{13}$, and $T_{14}$ to $T_{14}$ the server environment 328 is instructed to power on. Alternatively, from times $T_{11}$ to $T_{12}$, $T_{13}$ to $T_{14}$, and $T_{15}$ to $T_{16}$ the server environment 328 is instructed to power off. During those time periods, the visualization 330 illustrates usage activity 332 that varies over time. The usage activity is based on the current CPU utilization, current memory usage, current network bandwidth utilization, GPU utilization, number of active tasks, and the types of active tasks, to name a few examples. The computing system 110 instructs the server environment 328 to power on and power off during the time periods shown in the visualization 330.

Figure 4:
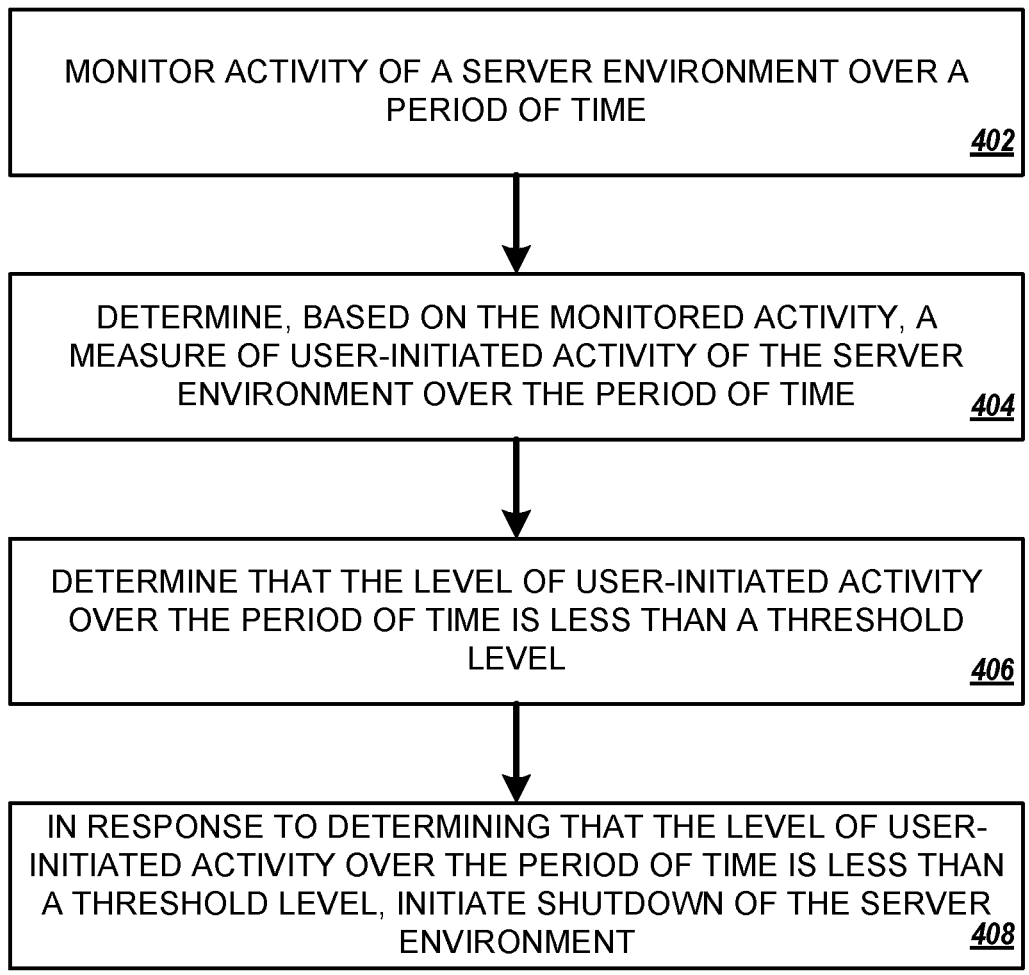
FIG. 4 is flow diagram that illustrates an example of a process for managing a server environment based on activity of the server environment.

FIG. 4 is flow diagram that illustrates an example of a process 400 for initiating a shut down of the server environment based on activity of the server environment.

During step 402, the computer system monitors activity of a server environment over a period of time. This includes receiving activity data corresponding to connection requests to the server environment, utilization of the server environment based on the requests from the client devices, and activity data corresponding to server environment. For example, the activity data executing on the server environment can include one or more jobs or processes running on the server environment, the types of jobs executing on the server environment, the types of inputs received at the server environment, and when the inputs are received at the server environment. Additionally, the activity data can include CPU usage, memory usage, thread count, disk usage, network usage, and GPU usage.

The computer system can also retrieve data corresponding to the processes performed on the computer environment. The data can include a number of users logged in to the server environment 106, a number of idle users that are logged in to the server environment 106, a number of currently active user sessions, a number of applications executing corresponding to each user logged in to the server environment 106, and a type of each of the applications or tasks that are executing on the server environment 106. Other data can be retrieved from the server environment 106, such as GPU processing data, network processing data, and memory usage information corresponding to each application executing on the server environment 106. The type of active sessions can include a scheduled activity or a user initiated activity.

During step 404, the computer system determines, based on the monitored activity of the server environment, a measure of user-initiated activity of the server environment over the period of time. The computer system evaluates the monitored activity data to determine applications that are user driven, which applications communicate back to the client devices, and retrieves historical activity data from a database. The historical activity data can be retrieved from various time periods before the current measuring period. Additionally, the computing system can retrieve historical activity data from a particular time, such as during the month of January 2015.

In some implementations, the computing system provides the analyzed activity data and the historical data to a machine learning model located at the computing system. The machine learning model can output a likelihood of usage of the server environment over a predetermined time period. For example, the usage of the server environment can include user initiated use of the server environment or system initiated use of the server environment. The likelihood can be, for example, 65% that user initiated activity will occur at the server environment within the next hour. The predetermined time period can be set by a user or automatically generated by the computer system based on previous activity time frames at the server environment.

During step 406, the computer system determines that the level of user-initiated activity over the period of time is less than a threshold level. The computer system can compare a usage likelihood threshold to the output of the machine learning model's prediction. For example, if the predicted likelihood is less than the usage likelihood threshold set by the computing system, then the computing system can generate a "Shut Down" command. Alternatively, if the predicted likelihood is greater than the usage likelihood threshold set by the computing system, then the computing system can generate a "Power On" command. The computing system can generate a "Restart" command if the server environment is already powered on.

During step 408, in response to determining that the level of user-initiated activity over the period of time is less than a usage likelihood threshold level, the computer system initiates shut down of the server environment. Once the computing system has determined that the level of user-initiated activity over the period of time is less than the usage likelihood threshold level, the computing system provides an instruction to the computing environment over the network. The computing system provides an instruction to the computing environment that instructs the server environment to power down. In some implementations, the computing system provides the instruction directly to the server environment to power down.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

Figure 5:
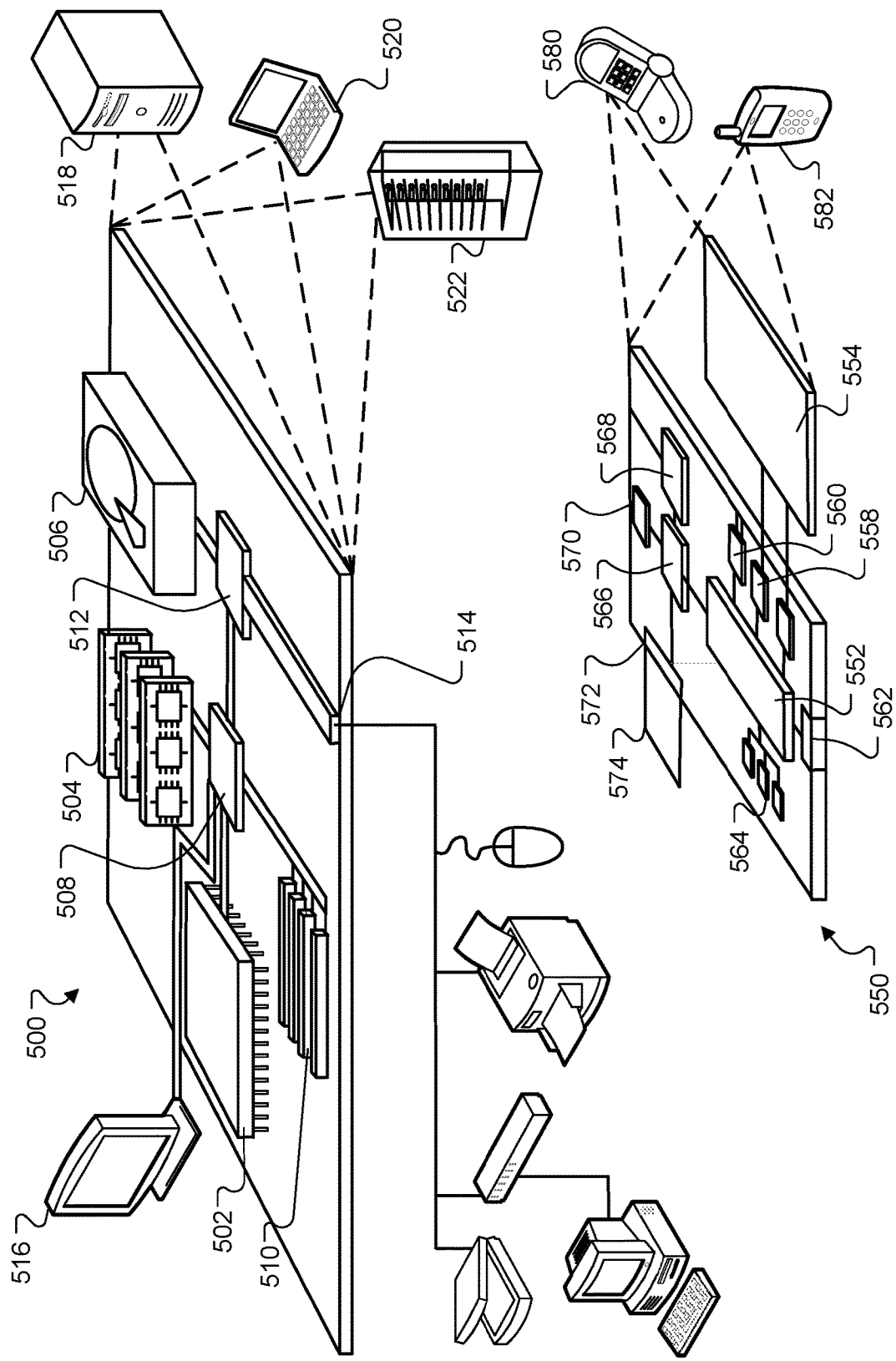
FIG. 5 shows an example of a computing device and a mobile computing device.

FIG. 5 shows an example of a computing device 500 and a mobile computing device 550 that can be used to implement the techniques described here. The computing device 500 is intended to represent various forms of digital computers, such as laptops, desktops, workstations, personal digital assistants, servers, blade servers, mainframes, and other appropriate computers. The mobile computing device 550 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 500 includes a processor 502, a memory 504, a storage device 506, a high-speed interface 508 connecting to the memory 504 and multiple high-speed expansion ports 510, and a low-speed interface 512 connecting to a low-speed expansion port 514 and the storage device 506. Each of the processor 502, the memory 504, the storage device 506, the high-speed interface 508, the high-speed expansion ports 510, and the low-speed interface 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as a display 516 coupled to the high-speed interface 508. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 504 stores information within the computing device 500. In some implementations, the memory 504 is a volatile memory unit or units. In some implementations, the memory 504 is a non-volatile memory unit or units. The memory 504 may also be another form of computer-readable medium, such as a magnetic or optical disk.

The storage device 506 is capable of providing mass storage for the computing device 500. In some implementations, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 502), perform one or more methods, such as those described above. The instructions can also be stored by one or more storage devices such as computer- or machine-readable mediums (for example, the memory 504, the storage device 506, or memory on the processor 502).

The high-speed interface 508 manages bandwidth-intensive operations for the computing device 500, while the low-speed interface 512 manages lower bandwidth-intensive operations. Such allocation of functions is an example only. In some implementations, the high-speed interface 508 is coupled to the memory 504, the display 516 (e.g., through a graphics processor or accelerator), and to the high-speed expansion ports 510, which may accept various expansion cards (not shown). In the implementation, the low-speed interface 512 is coupled to the storage device 506 and the low-speed expansion port 514. The low-speed expansion port 514, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 518, or multiple times in a group of such servers. In addition, it may be implemented in a personal computer such as a laptop computer 520. It may also be implemented as part of a rack server system 522. Alternatively, components from the computing device 500 may be combined with other components in a mobile device (not shown), such as a mobile computing device 550. Each of such devices may contain one or more of the computing device 500 and the mobile computing device 550, and an entire system may be made up of multiple computing devices communicating with each other.

The mobile computing device 550 includes a processor 552, a memory 564, an input/output device such as a display 554, a communication interface 566, and a transceiver 568, among other components. The mobile computing device 550 may also be provided with a storage device, such as a micro-drive or other device, to provide additional storage. Each of the processor 552, the memory 564, the display 554, the communication interface 566, and the transceiver 568, are interconnected using various buses, and several of the components may be mounted on a common motherboard or in other manners as appropriate.

The processor 552 can execute instructions within the mobile computing device 550, including instructions stored in the memory 564. The processor 552 may be implemented as a chipset of chips that include separate and multiple analog and digital processors. The processor 552 may provide, for example, for coordination of the other components of the mobile computing device 550, such as control of user interfaces, applications run by the mobile computing device 550, and wireless communication by the mobile computing device 550.

The processor 552 may communicate with a user through a control interface 558 and a display interface 556 coupled to the display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may provide communication with the processor 552, so as to enable near area communication of the mobile computing device 550 with other devices. The external interface 562 may provide, for example, for wired communication in some implementations, or for wireless communication in other implementations, and multiple interfaces may also be used.

The memory 564 stores information within the mobile computing device 550. The memory 564 can be implemented as one or more of a computer-readable medium or media, a volatile memory unit or units, or a non-volatile memory unit or units. An expansion memory 574 may also be provided and connected to the mobile computing device 550 through an expansion interface 572, which may include, for example, a SIMM (Single In Line Memory Module) card interface. The expansion memory 574 may provide extra storage space for the mobile computing device 550, or may also store applications or other information for the mobile computing device 550. Specifically, the expansion memory 574 may include instructions to carry out or supplement the processes described above, and may include secure information also. Thus, for example, the expansion memory 574 may be provided as a security module for the mobile computing device 550, and may be programmed with instructions that permit secure use of the mobile computing device 550. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier, such that the instructions, when executed by one or more processing devices (for example, processor 552), perform one or more methods, such as those described above. The instructions can also be stored by one or more storage devices, such as one or more computer- or machine-readable mediums (for example, the memory 564, the expansion memory 574, or memory on the processor 552). In some implementations, the instructions can be received in a propagated signal, for example, over the transceiver 568 or the external interface 562.

The mobile computing device 550 may communicate wirelessly through the communication interface 566, which may include digital signal processing circuitry where necessary. The communication interface 566 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 568 using a radio-frequency. In addition, short-range communication may occur, such as using a Bluetooth, WiFi, or other such transceiver (not shown). In addition, a GPS (Global Positioning System) receiver module 570 may provide additional navigation- and location-related wireless data to the mobile computing device 550, which may be used as appropriate by applications running on the mobile computing device 550.

The mobile computing device 550 may also communicate audibly using an audio codec 560, which may receive spoken information from a user and convert it to usable digital information. The audio codec 560 may likewise generate audible sound for a user, such as through a speaker, e.g., in a handset of the mobile computing device 550. Such sound may include sound from voice telephone calls, may include recorded sound (e.g., voice messages, music files, etc.) and may also include sound generated by applications operating on the mobile computing device 550.

The mobile computing device 550 may be implemented in a number of different forms, as shown in the figure. For example, it may be implemented as a cellular telephone 580. It may also be implemented as part of a smart-phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
    monitoring, by the one or more computers, a server environment to detect activity of the server environment over a period of time;
    determining, by the one or more computers, an amount of the detected activity that corresponds to user requests or active user sessions over the period of time;
    determining, by the one or more computers, that the amount of the detected activity corresponding to user requests or active user sessions is below a first threshold level;
    generating, by the one or more computers, a usage prediction regarding an amount of future activity of the server environment predicted to be caused by user requests or active user sessions over a future time period, wherein generating the usage prediction comprises providing information indicating activity of the server environment to a machine learning model trained to provide output indicating a prediction of future user-initiated activity of the server environment, wherein the output of the machine learning model indicates at least one of: a prediction indicating an amount of use predicted to occur over the future time period; a likelihood that future use of at least a minimum level will occur over the future time period; or a predicted time when use is predicted to reach a particular level;
    determining, by the one or more computers, that the usage prediction indicates a level of future activity from user requests or active user sessions that is less than a second threshold level, comprising determining that the output of the machine learning model indicates that user-initiated activity of the server environment is likely to be less than the second threshold level for at least a portion of the future time period; and
    in response to (i) determining based on the output of the machine learning model that the amount of the detected activity corresponding to user requests or active user sessions over the period of time is below the first threshold level and (ii) determining that the usage prediction indicates a level of future activity from user requests or active user sessions that is less than the second threshold level, initiating, by the one or more computers, shutdown of the server environment.

2. The method of claim 1, further comprising:
    after shutting down the server environment, determining, based at least in part on prior usage of the server environment, that at least a minimum level of user-initiated activity is likely to occur; and
    powering on the server environment in response to determining that at least the minimum level of user-initiated activity is likely to occur.

3. The method of claim 2, comprising storing state information of the server environment, including data for one or more tasks running in the server environment, in non-volatile storage before shutting down the server environment; and
    wherein re-starting the server environment comprises loading the state information and resuming the one or more tasks that were running in the server environment before shutting down the server environment.

4. The method of claim 1, wherein the server environment is a virtual server environment, and shutting down the server environment comprises stopping the virtual server environment.

5. The method of claim 1, wherein the server environment comprises one or more server computers, and shutting down the server environment comprises powering down the one or more server computers.

6. The method of claim 1, wherein monitoring the server environment comprises monitoring at least one of: central processing unit utilization, memory usage, an amount of network bandwidth utilized, an amount of input or output operations, a number of tasks running, types of tasks running, priority levels of tasks running, a number of users logged in to the server environment, a number of users actively using the server environment, or a level of interactivity of running tasks.

7. The method of claim 1, wherein monitoring the server environment comprises measuring utilization of the server environment over the period of time; and
    wherein determining the amount of the detected activity that corresponds to user requests or active user sessions over the period of time comprises determining a portion of the measured utilization that supports active user sessions that receive user input at a rate that satisfies a predetermined threshold.

8. A system comprising:
    one or more computers; and
    one or more computer-readable media storing instructions that, when executed by the one or more computers, cause the one or more computers to perform operations comprising:
        monitoring, by the one or more computers, a server environment to detect activity of the server environment over a period of time;
        determining, by the one or more computers, an amount of the detected activity that corresponds to user requests or active user sessions over the period of time;
        determining, by the one or more computers, that the amount of the detected activity corresponding to user requests or active user sessions is below a first threshold level;
        generating, by the one or more computers, a usage prediction regarding an amount of future activity of the server environment predicted to be caused by user requests or active user sessions over a future time period, wherein generating the usage prediction comprises providing information indicating activity of the server environment to a machine learning model trained to provide output indicating a prediction of future user-initiated activity of the server environment, wherein the output of the machine learning model indicates at least one of: a prediction indicating an amount of use predicted to occur over the future time period; a likelihood that future use of at least a minimum level will occur over the future time period; or a predicted time when use is predicted to reach a particular level;
        determining, by the one or more computers, that the usage prediction indicates a level of future activity from user requests or active user sessions that is less than a second threshold level, comprising determining that the output of the machine learning model indicates that user-initiated activity of the server environment is likely to be less than the second threshold level for at least a portion of the future time period; and in response to (i) determining based on the output of the machine learning model that the amount of the detected activity corresponding to user requests or active user sessions over the period of time is below the first threshold level and (ii) determining that the usage prediction indicates a level of future activity from user requests or active user sessions that is less than the second threshold level, initiating, by the one or more computers, shutdown of the server environment.

9. The system of claim 8, wherein the operations further comprise:

after shutting down the server environment, determining, based at least in part on prior usage of the server environment, that at least a minimum level of user-initiated activity is likely to occur; and powering on the server environment in response to determining that at least the minimum level of user-initiated activity is likely to occur.

10. The system of claim 9, comprising storing state information of the server environment, including data for one or more tasks running in the server environment, in non-volatile storage before shutting down the server environment; and wherein re-starting the server environment comprises loading the state information and resuming the one or more tasks that were running in the server environment before shutting down the server environment.

11. The system of claim 8, wherein monitoring the server environment comprises measuring utilization of the server environment over the period of time; and wherein determining the amount of the detected activity that corresponds to user requests or active user sessions over the period of time comprises determining a portion of the measured utilization that supports active user sessions that receive user input at a rate that satisfies a predetermined threshold.

12. One or more non-transitory computer-readable media storing instructions that, when executed by one or more computers, cause the one or more computers to perform operations comprising:

monitoring, by the one or more computers, a server environment to detect activity of the server environment over a period of time;

determining, by the one or more computers, an amount of the detected activity that corresponds to user requests or active user sessions over the period of time;

determining, by the one or more computers, that the amount of the detected activity corresponding to user requests or active user sessions is below a first threshold level;

generating, by the one or more computers, a usage prediction regarding an amount of future activity of the server environment predicted to be caused by user requests or active user sessions over a future time period, wherein generating the usage prediction comprises providing information indicating activity of the server environment to a machine learning model trained to provide output indicating a prediction of future user-initiated activity of the server environment, wherein the output of the machine learning model indicates at least one of: a prediction indicating an amount of use predicted to occur over the future time period; a likelihood that future use of at least a minimum level will occur over the future time period; or a predicted time when use is predicted to reach a particular level;

determining, by the one or more computers, that the usage prediction indicates a level of future activity from user requests or active user sessions that is less than a second threshold level, comprising determining that the output of the machine learning model indicates that user-initiated activity of the server environment is likely to be less than the second threshold level for at least a portion of the future time period; and in response to (i) determining based on the output of the machine learning model that the amount of the detected activity corresponding to user requests or active user sessions over the period of time is below the first threshold level and (ii) determining that the usage prediction indicates a level of future activity from user requests or active user sessions that is less than the second threshold level, initiating, by the one or more computers, shutdown of the server environment.

13. The method of claim 1, wherein the detected activity includes (i) processing performed in response to user requests and (ii) processing that is not performed in response to user requests; and wherein the amount of the detected activity that corresponds to user requests or active user sessions over the period of time excludes the processing that is not performed in response to user requests.

14. The method of claim 13, wherein the processing not performed in response to user requests comprises activity of the server environment for performing monitoring, logging, maintenance, or scheduled tasks.

15. The method of claim 1, wherein a total amount of detected activity for the server environment during the period of time is greater than the first threshold level, wherein the amount of the detected activity determined to correspond to user requests or active user sessions over the period of time is less than the first threshold level, and wherein shutdown of the server environment is initiated even though the total amount of detected activity is greater than the first threshold level.

16. The method of claim 1, wherein the detected activity of the server environment comprises a set of tasks;

wherein the method comprises classifying a first subset of the tasks as system tasks and classifying a second subset of the tasks as user tasks; and wherein the amount of the detected activity corresponding to user requests or active user sessions is an amount of activity for the second subset of the tasks.

17. The system of claim 8, wherein a total amount of detected activity for the server environment during the period of time is greater than the first threshold level, wherein the amount of the detected activity determined to correspond to user requests or active user sessions over the period of time is less than the first threshold level, and wherein shutdown of the server environment is initiated even though the total amount of detected activity is greater than the first threshold level.

18. The system of claim 8, wherein the system is configured to initiate shutdown of the server environment when the amount of the detected activity determined to correspond to user requests or active user sessions over the period of time is less than the first threshold level even though a total amount of detected activity of the server environment is greater than the first threshold level.

19. The one or more non-transitory computer-readable media of claim 12, wherein a total amount of detected activity for the server environment during the period of time is greater than the first threshold level, wherein the amount of the detected activity determined to correspond to user requests or active user sessions over the period of time is less than the first threshold level, and wherein shutdown of the server environment is initiated even though the total amount of detected activity is greater than the first threshold level.

20. The one or more non-transitory computer-readable media of claim 12, wherein the one or more computers are configured to initiate shutdown of the server environment when the amount of the detected activity determined to correspond to user requests or active user sessions over the period of time is less than the first threshold level even though a total amount of detected activity of the server environment is greater than the first threshold level.

* * * * *